United States Patent
Kim et al.

(10) Patent No.: US 8,949,341 B2
(45) Date of Patent: Feb. 3, 2015

(54) METHOD AND APPARATUS FOR PROVIDING INFORMATION ON HUMAN RELATIONS BASED ON ANALYSIS OF LOG DATA IN MOBILE COMMUNICATION TERMINAL

(75) Inventors: Jung Hun Kim, Busan (KR); Young Ho Rhee, Seoul (KR); Jae Hwan Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1638 days.

(21) Appl. No.: 12/056,810

(22) Filed: Mar. 27, 2008

(65) Prior Publication Data

US 2008/0256098 A1 Oct. 16, 2008

(30) Foreign Application Priority Data

Apr. 13, 2007 (KR) .......................... 10-2007-0036237

(51) Int. Cl.
 *G06F 15/16* (2006.01)
 *G06Q 10/00* (2012.01)
 *G06Q 50/00* (2012.01)

(52) U.S. Cl.
 CPC ................ *G06Q 10/00* (2013.01); *G06Q 50/01* (2013.01)
 USPC ........ 709/206; 709/204; 709/207; 455/412.2; 455/414.1; 455/416; 455/422.1

(58) Field of Classification Search
 CPC ................... H04M 1/27455; H04M 1/274583; H04M 1/575; H04M 1/72519; H04M 3/2218; H04M 15/58; H04M 2215/0188
 USPC .......... 455/405–406, 412.1–414.1, 415, 466, 455/67.7, 566–569.1; 707/648–653
 See application file for complete search history.

(56) References Cited

U.S. PATENT DOCUMENTS

| | | | |
|---|---|---|---|
| 6,594,481 B1 * | 7/2003 | Johnson et al. ................ 455/410 |
| 2004/0017376 A1 * | 1/2004 | Tagliabue et al. ............. 345/581 |
| 2004/0253993 A1 * | 12/2004 | Nakamura ..................... 455/567 |
| 2007/0165806 A1 * | 7/2007 | Bocking et al. .......... 379/142.01 |
| 2008/0033946 A1 * | 2/2008 | Bhogal et al. ..................... 707/7 |
| 2010/0330954 A1 * | 12/2010 | Manning Cassett et al. . 455/405 |
| 2013/0170630 A1 * | 7/2013 | Cooper ......................... 379/67.1 |
| 2013/0290431 A1 * | 10/2013 | Armstrong et al. ........... 709/204 |

FOREIGN PATENT DOCUMENTS

| | | |
|---|---|---|
| JP | 11-252648 | 9/1999 |
| JP | 2003-018282 | 1/2003 |

(Continued)

*Primary Examiner* — Dai A Phuong
(74) *Attorney, Agent, or Firm* — The Farrell Law Firm, P.C.

(57) ABSTRACT

Provided are a method and apparatus, which analyze many aspects of log data generated in a mobile communication terminal, calculate changes in human relations based on opposite parties of communication, and provide information on human relations in a variety of ways. Specifically, first log data for a most recent first period and second log data for a second period are acquired, in which the second period is earlier than the first period. Amounts of the first and second log data for the first and second periods are calculated, respectively. The averages of the amounts of first and second log data are also calculated, respectively, and then compared with each other. The changes in human relations are determined based on opposite parties. Therefore, users can easily read the changes in human relations based on opposite parties of communication.

26 Claims, 8 Drawing Sheets

(56) References Cited

FOREIGN PATENT DOCUMENTS

| JP | 2004-153420 | 5/2004 |
|----|-------------|--------|
| JP | 2004-304719 | 10/2004 |
| KR | 1020010094221 | 10/2001 |
| KR | 1020060026285 | 3/2006 |
| KR | 1020060048943 | 5/2006 |
| KR | 102006007333 | 6/2006 |
| KR | 100648899 | 11/2006 |

* cited by examiner

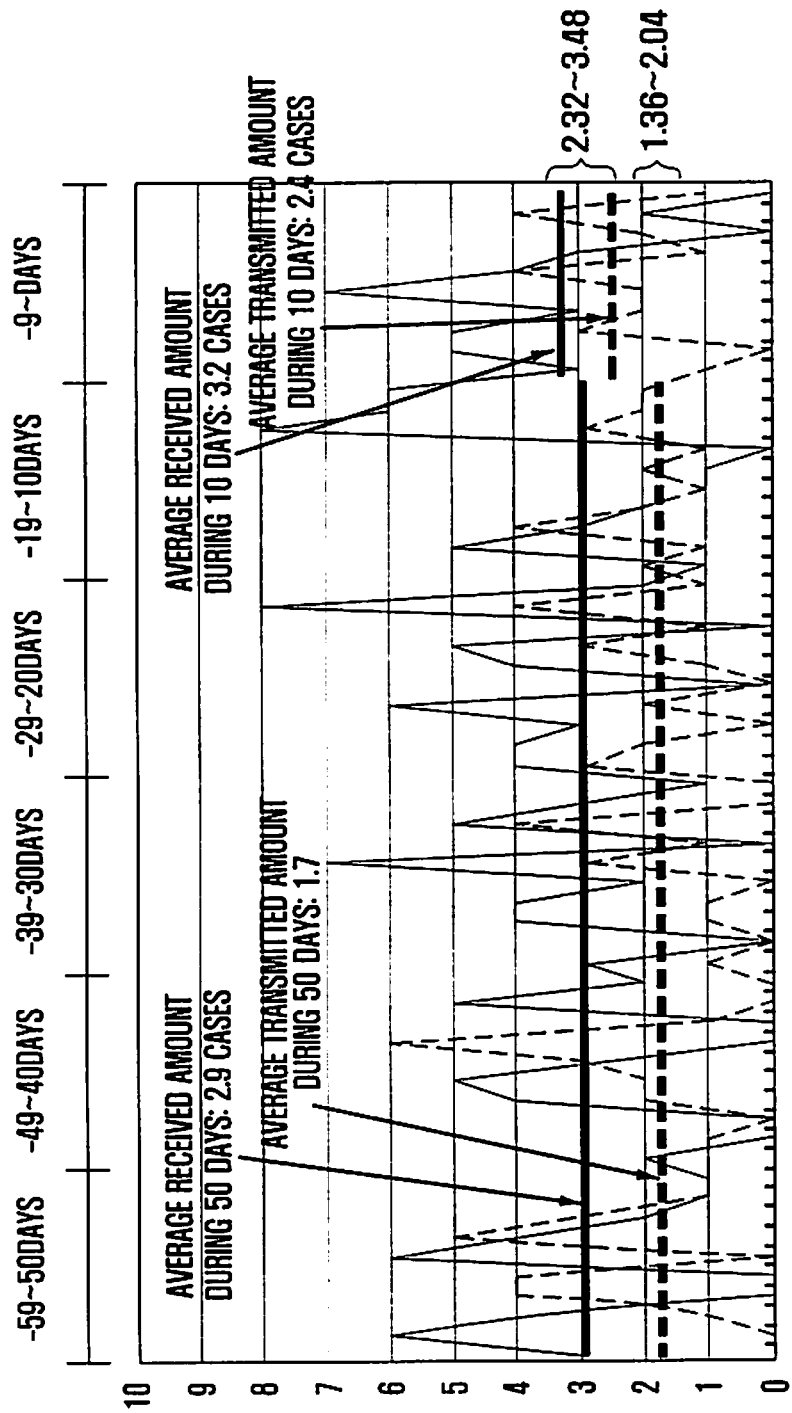

FIG. 7

↗ INCREASING  → MAINTAINING  ↘ DECREASING  O NONE

| CHANGE OF RECEIVED DATA AMOUNT | CHANGE OF TRANSMITTED DATA AMOUNT | CHANGE IN HUMAN RELATIONS | ICON |
|---|---|---|---|
| ↗ | ↗ | YOU ARE GETTING CLOSER TO "NAME" | OPPOSITE PARTY 🙂  🙂 YOU |
|  | → | "NAME" CONTACTS YOU MANY MORE TIMES THAN YOU DO | OPPOSITE PARTY 🙂  🙂 YOU |
|  | ↘ | YOU MAY BE NEGLIGENT IN CONTACTING "NAME" | OPPOSITE PARTY 🙂  🙁 YOU |
|  | O | PLEASE CONTACT "NAME" | OPPOSITE PARTY 🙂  🙁 YOU |
| → | ↗ | YOUR INTEREST IN "NAME" IS GROWING | OPPOSITE PARTY 🙂  🙂 YOU |
|  | → | YOU ARE REGULARLY CONTACTING "NAME" | OPPOSITE PARTY 🙂  🙂 YOU |
|  | ↘ | IS YOUR INTEREST IN "NAME" DECREASING? | OPPOSITE PARTY 🙂  🙁 YOU |
|  | O | WHY DIDN'T YOU CONTACT "NAME"? | OPPOSITE PARTY 🙂  🙁 YOU |
| ↘ | ↗ | "NAME" IS OFTEN NEGLIGENT IN CONTACTING YOU | OPPOSITE PARTY 🙁  🙂 YOU |
|  | → | "NAME" SEEMS TO BE LOSING INTEREST IN YOU | OPPOSITE PARTY 🙁  🙂 YOU |
|  | ↘ | YOU AND "NAME" ARE BECOMING ESTRANGED | OPPOSITE PARTY 🙁  🙁 YOU |
|  | O | YOU AND "NAME" WILL LIKELY BECOME ESTRANGED | OPPOSITE PARTY 🙁  🙁 YOU |
| O | ↗ | "NAME" COULD HAVE CALLED YOU BACK | OPPOSITE PARTY 🙁  🙂 YOU |
|  | → | WHY DIDN'T "NAME" CONTACT YOU? | OPPOSITE PARTY 🙁  🙂 YOU |
|  | ↘ | YOU AND "NAME" WILL LIKELY BECOME ESTRANGED | OPPOSITE PARTY 🙁  🙁 YOU |
|  | O | YOU AND "NAME" ARE NOW ESTRANGED | OPPOSITE PARTY 🙁  🙁 YOU |

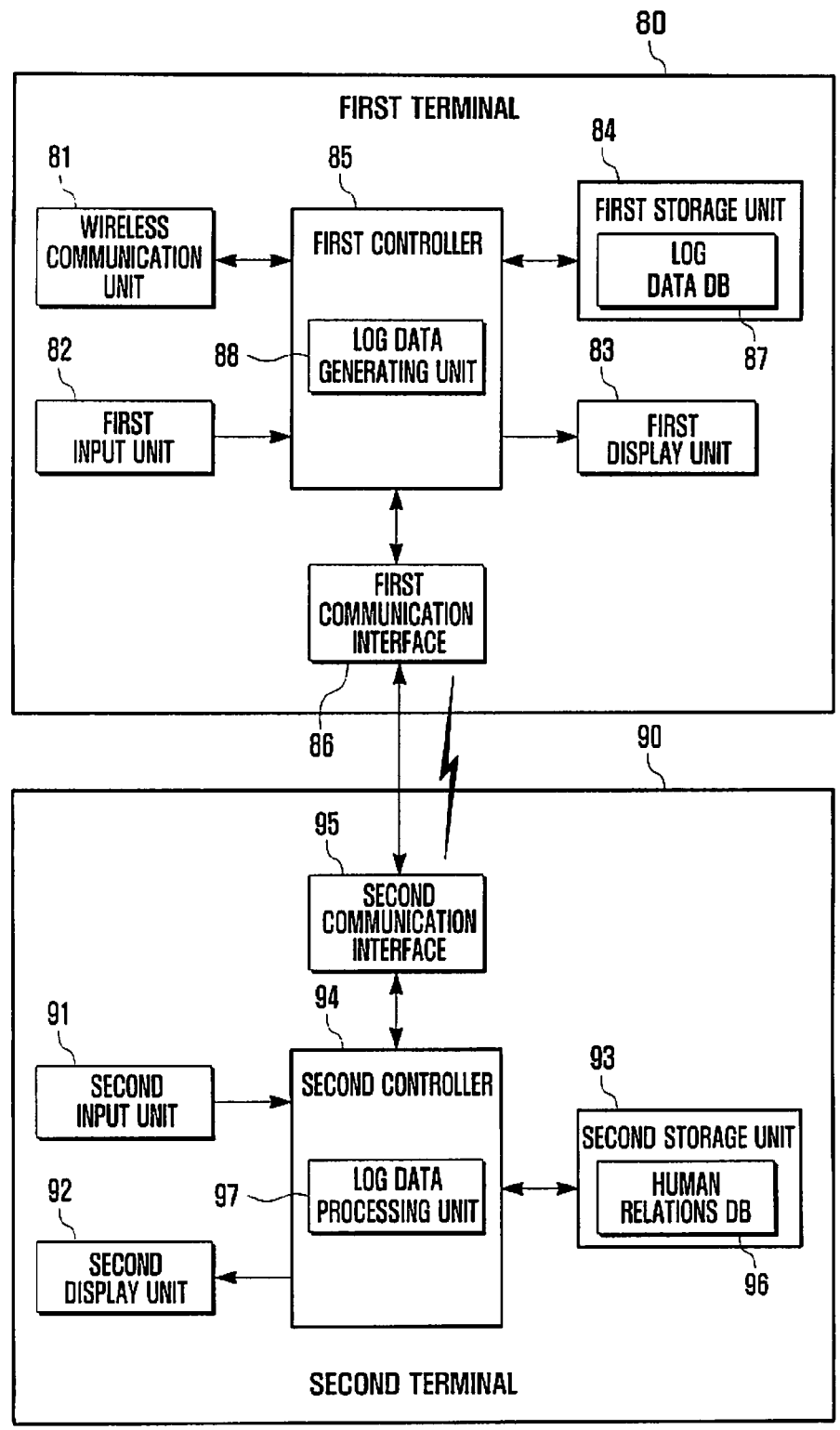

METHOD AND APPARATUS FOR PROVIDING INFORMATION ON HUMAN RELATIONS BASED ON ANALYSIS OF LOG DATA IN MOBILE COMMUNICATION TERMINAL

PRIORITY

This application claims priority under 35 U.S.C. 119(a) to a Korean Patent Application entitled "METHOD AND APPARATUS FOR PROVIDING INFORMATION ON HUMAN RELATIONS BASED ON ANALYSIS OF LOG DATA IN MOBILE COMMUNICATION TERMINAL" filed in the Korean Intellectual Property Office on Apr. 13, 2007 and assigned Serial No. 2007-0036237, the contents of which are incorporated herein by reference.

BACKGROUND OF THE INVENTION

1. Field of the Invention

The present invention relates to technology using log data of a mobile communication terminal, and more particularly to a method and apparatus that analyze many aspects of log data of a mobile communication terminal, calculate the changes in human relations based on opposite parties of communication, and provide information on human relations based on the changes, in a variety of ways.

2. Description of the Related Art

As information communication technology, semiconductor technology, etc., have been remarkably developed, a variety of mobile communication terminals have rapidly proliferated in recent years. Moreover, recent mobile communication technology has been developed such that mobile communication terminals can provide services of other types of terminals; this recent development is called mobile convergence. As a typical example, a mobile phone can now have a variety of functions, such as a videophone function, a multimedia communication function, a wireless Internet function, a short range wireless communication function, a mobile broadcast transmission/reception function, etc., as well as the mobile phone's inherent communication functions, such as a voice call function and Short Message Service (SMS) services. Additionally, the mobile phone is increasingly developing in size, design, display resolution, user interfaces, etc.

Generally, mobile communication terminals provide users with call records for a certain period of time or for a certain amount of call records, message records, etc., for a user's convenience. Such records are often called "log data." The conventional mobile communication terminals provide the log data in a one-dimensional array format in chronological order. That is, the log data is displayed starting from the most recent event to the oldest event, or in reverse time order. Such log data may be sorted according to types of calls or types of messages, etc.

Such log data, provided based on the event types in time order, is advantageous in that a user can easily call the latest caller. To the contrary, the log data has drawbacks in that the user cannot easily check call times or a total amount of calls originating from other callers. Moreover, through the data log provided by the conventional mobile communication terminal, the user never reads how human relations between the user and other callers are developing, i.e., how human relations are changing.

SUMMARY OF THE INVENTION

The present invention is made to solve the above problems, and therefore, the present invention provides a method and apparatus for providing information on human relations that can enhance the application of log data of a mobile communication terminal.

Further provided is a method and apparatus for providing information on human relations that enable a user to read easily the change in human relations based on the user's communication with opposite parties in a mobile communication terminal.

Further provided is a method and apparatus for providing information on human relations that can provide information on human relations between a user and opposite parties, through a variety of ways, depending on whether the user communicates with the opposite parties using a mobile communication terminal.

In accordance with an exemplary embodiment of the present invention, provided is a method for providing information on human relations includes acquiring first log data for a latest first period and second log data for a second period from a mobile communication terminal, wherein the second period is earlier than the latest first period; analyzing the first log data and the second log data, and comparing the first and second log data with each other; and determining a change in human relations based on results of the comparison.

Preferably, comparing the first and second log data includes calculating averages of amounts of the first and second log data, respectively; and comparing the calculated averages of the amounts of the first and second log data. In addition, the change in human relations is determined to be increasing, if the average of the first log data is greater than the average of the second log data; and decreasing, if the average of the first log data is less than the average of the second log data.

Preferably, comparing the first and second log data includes calculating averages of amounts of the first and second log data, respectively; setting a range having upper and lower limits to the average of the second log data; and comparing the average of the first log data with the range of the average of the second log data.

Preferably, the method may further include visually expressing the determined change in human relations. Here, the visual expression displays the determined change in human relations through at least one of texts, numerals, and graphic elements.

Preferably, the method may further include transmitting the determined change in human relations.

Preferably, the first period is from x days ago to today; and the second period is from y days ago to x+1 days ago. Here, wherein x and y are the natural numbers, and y is greater than x. Additionally, the first and second log data include communication records generated as a user communicates with opposite parties, respectively, and personal information prepared by the user.

Preferably, comparing the first and second log data includes analyzing received data of the first and second log data, respectively, and comparing the received data of the first log data to the received data of the second log data; and analyzing transmitted data of the first and second log data, respectively, and comparing the transmitted data of the first log data to the transmitted data of the second log data. Here, change in human relations includes determining changes of the received data and the transmitted data to be one of increasing, maintaining, decreasing, and no log data, respectively; and determining the change in human relations based on combination of the changes of the received data and the transmitted data.

Preferably, the method may further include visually expressing the change of received data, the change of transmitted data, and the change in human relations, respectively.

In accordance with another exemplary embodiment of the present invention, a method for providing information on human relations includes acquiring first log data for a first period and second log data for a second period from a mobile communication terminal; calculating an amount of the first log data and an amount of the second log data, based on opposite parties, from the first log data and the second log data, respectively; calculating averages of the amount of the first log data and of the amount of the second log data, based on opposite parties, respectively; comparing the calculated averages of the amount of the first log data to the average of the amount of the second log data; and determining a change in human relations based on opposite parties based on results of the compared result.

Preferably, the method may further include visually expressing the determined change in human relations based on opposite parties. The visual expression displays the determined change in human relations based on opposite parties through at least one of texts, numerals, and graphic elements. The visual expression displays a total rank according to the amounts of log data based on opposite parties.

Preferably, the method may further include transmitting the determined change in human relations based on opposite parties.

Preferably, the first period is from x days ago to today; and the second period is from y days ago to x+1 days ago. Here, x and y are natural numbers, and y is greater than x. As well, the second period is greater than or equal to the first period.

Preferably, the first and second log data includes communication records generated as a user communicates with opposite parties, respectively, and personal information prepared by the user. The communication records include at least one of incoming/originating records of voice calls and video calls, incoming/originating records of Short Message Service (SMS) messages and multimedia messages, incoming/originating records of emails, sent/received records of data, and use records of messengers.

Preferably, comparing the calculated averages includes setting a range having upper and lower limits to the average of the amount of second log data; and comparing the average of the amount of first log data with the range of the average of the amount of second log data. Here, change in human relations includes determining the change in human relations to be increasing if the average of the amount of the first log data is greater than the range of the average of the amount of the second log data; determining the change in human relations to be decreasing if the average of the amount of the first log data is less than the range; and determining the change in human relations to be maintaining if the average of the amount of the first log data is within the range.

Preferably, calculating averages includes calculating averages of received data amount and transmitted data amount of the first log data; and calculating averages of received data amount and transmitted data amount of the second log data. Here, comparing the calculated averages includes comparing the average of the received data amount of first log data with that the average of the received data amount of second log data; and comparing the average of the transmitted data amount of first log data with that the average of the transmitted data amount of second log data. In addition, change in human relations includes determining changes of the received data amount and of the transmitted data amount to be one of increasing, maintaining, decreasing, and no log data, respectively; and determining the change in human relations based on combination of the changes of the received data amount and of the transmitted data amount.

Preferably, the method may further include visually expressing the change of the received data amount, the change of the transmitted data amount, and the change in human relations, respectively.

In accordance with another exemplary embodiment of the present invention, an apparatus for providing change in human relation includes a unit for generating log data; a log data DataBase (DB) for storing the log data; a human relations DB for storing changes in human relations based on opposite parties, which are calculated based on the log data; a log data processing unit for acquiring the log data for first and second periods from the log data DB, calculating amounts of log data for the respective first and second periods based on opposite parties, calculating averages of the respective amounts of log data for the first and second periods, comparing the averages of the amounts of log data for the first and second periods, and determining the changes in human relations opposite parties; and a display unit for displaying the changes in human relations based on opposite parties.

In accordance with another exemplary embodiment of the present invention, an apparatus for providing information on human relations includes a first terminal for generating log data; and a second terminal for receiving the log data and generating the information on human relations. Here, the first terminal includes a unit for generating log data; a log data DB for storing the log data; and a first communication interface unit. In addition, the second terminal includes a second communication interface unit that is connected to the first communication interface unit; a log data processing unit that acquires the log data for first and second periods from the log data DB, calculates amounts of log data for the respective first and second periods based on opposite parties, calculates averages of the respective amounts, compares the averages of the amounts of log data for the first and second periods, and determines the changes in human relations opposite parties; and a human relations DB that stores changes in human relations based on opposite parties.

BRIEF DESCRIPTION OF THE DRAWINGS

The objects, features, and advantages of the present invention will be more apparent from the following detailed description in conjunction with the accompanying drawings, in which:

FIG. 6 is an analysis graph of log data for calculating information on human relations according to an exemplary embodiment of the present invention;

FIG. 7 is a list describing types and patterns of change in human relations, according to an exemplary embodiment of the present invention;

FIG. 8 is a schematic block diagram illustrating an apparatus for providing information on human relations according to another exemplary embodiment of the present invention.

DETAILED DESCRIPTION OF EXEMPLARY EMBODIMENTS

Hereinafter, exemplary embodiments of the present invention are described in detail with reference to the accompanying drawings. Detailed descriptions of well-known functions and structures incorporated herein may be omitted to avoid obscuring the subject matter of the present invention.

Prior to explaining the embodiments of the present invention, terms will be defined in the description below as follows:

1. Communication: refers to a general term for transmission and reception of a voice call, a video call, a Short Message Service (SMS) message, a multimedia message, an email, data, and for messenger use (such as a chatting service), etc. The communication may be referred to as a "communication event."

2. Log data: refers to communication records generated as a user communicates with opposite parties using a mobile communication terminal, and to personal information prepared by a user, as well. The communication record refers to, for example, a record related to received voice calls, and a record related to transmitted SMS messages, etc. The personal information includes, for example, an address, a schedule, a memorandum, work information, an alarm, etc. The personal information can become the log data provided that the personal information includes information about opposite parties.

3. Amount of log data: refers to the result calculated based on the analysis of log data, including the number of uses, the amount of time used, data capacity, etc. For example, when the log data is a record of incoming voice calls, the amount of log data may become the number of calls and the amount of call time. When the log data is a record of originating SMS messages, the amount of log data may become the number of transmitted messages and the number of messages. When the log data is personal information, the amount of log data may become the number of preparations and the data capacity.

4. Information on human relations: refers to a general term for an amount of log data calculated based on opposite parties for a certain period of time, and for the change in human relations and the rank of human relations calculated from the amount of calculated log data.

5. Change in human relations: indicates degree of change of the amount of log data, and is classified into improving, maintaining, weakening, and none.

6. Opposite party: refers to a general term for opposite parties with whom a user communicates and who are included in person information.

Figure 1:
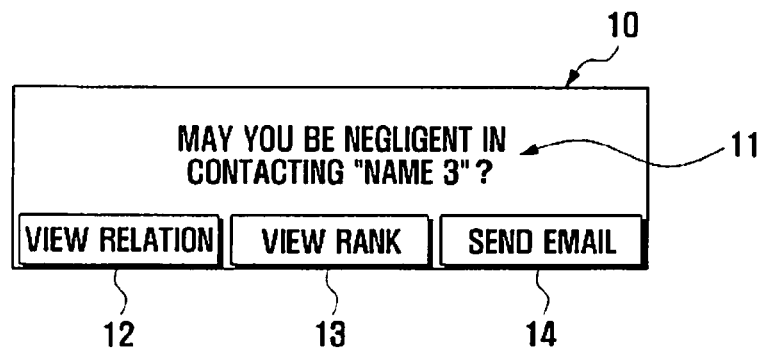
FIGS. 1 to 3 are screens providing information on human relations according to an exemplary embodiment of the present invention.
Figure 2:
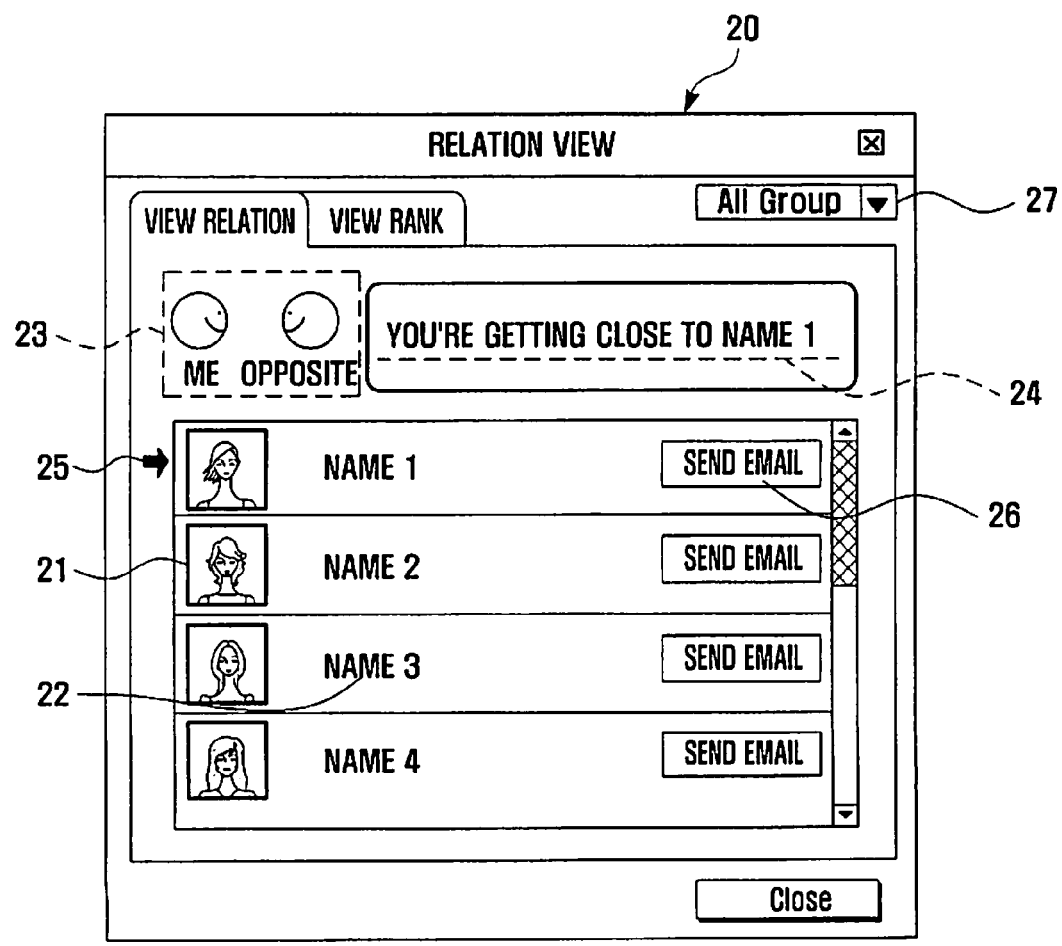
Figure 3:
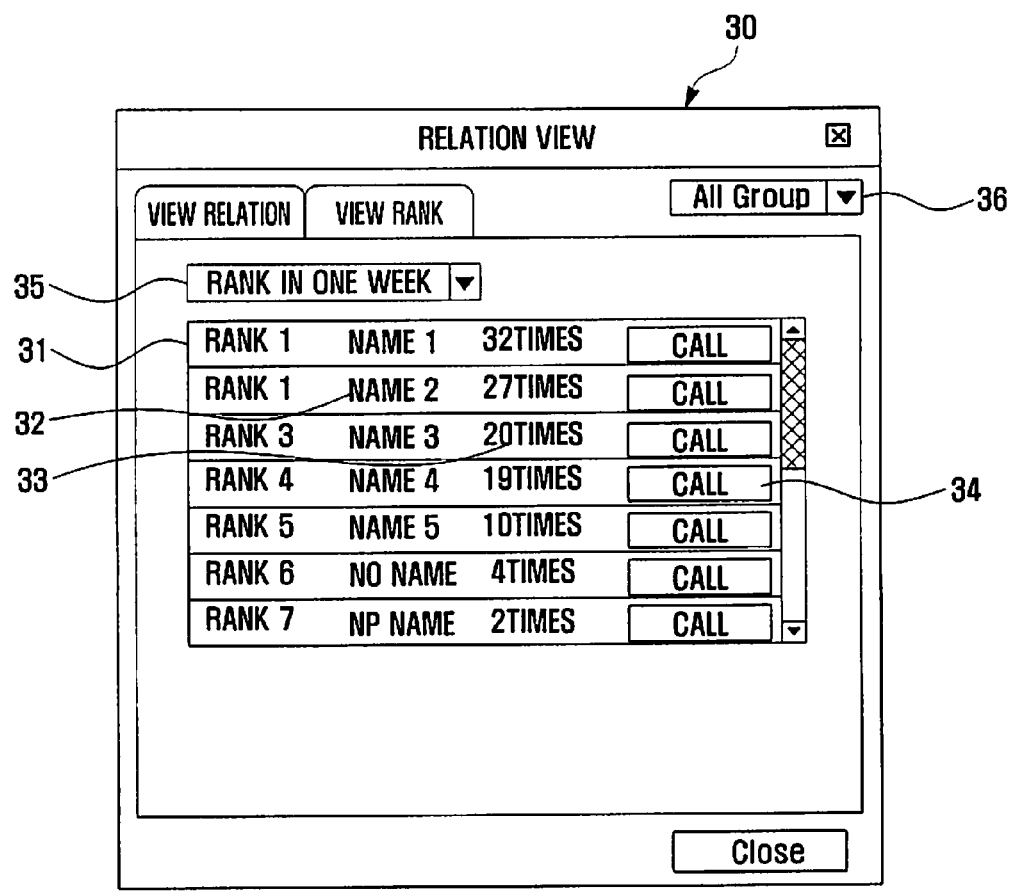

FIGS. 1 to 3 are screens providing information on human relations according to an exemplary embodiment of the present invention.

As shown in FIG. 1, a screen 10 shows information on human relations with a particular opposite party in a text 11. The screen 10 may be implemented with a window that appears in a certain region in the display screen, or in a pop-up window. The display 10 changes and shows information of human relations of different opposite parties, periodically. In other words, as shown in FIG. 1, the text 11, indicative of information on human relations about 'Name 3' one of the opposite parties, may change cyclically in such a way that the information on human relations about Name 3 is changed to other information on human relations about other opposite parties, repeatedly, after a certain period of time (for example, every 5 seconds).

The screen 10 displays a variety of tabs at the bottom thereof, such as View Relation 12, View Rank 13, Send e-mail 14, etc. When the tab, View Relation 12, is selected, a screen is shown as depicted in FIG. 2. When the tab, View Rank 13, a screen is shown as depicted in FIG. 3. Additionally, referring to FIG. 1, when the tab, Send e-mail 14, is selected, a function is executed to send an email to the opposite party displayed in the screen 10. However, the Send-Email tab 14, may be implemented in such a way that, when it is selected, the screen displays a list of executable functions, such as "Send e-mail", "Call", "Send Message", "Send Data", etc.

A "View Relations" screen 20, shown in FIG. 2, provides information on changes in human relations based on opposite parties. In addition, a "View Rank" screen 30, depicted in FIG. 3, provides rankings based on an amount of log data for all opposite parties stored in a mobile communication terminal.

In particular, the View Relations screen 20 in FIG. 2 displays face images 21 and names 22 of opposite parties. When one of the face images 21 and names 22 of a corresponding opposite party is selected, the screen shows a graphic element 23 and a text 24 of a change in human relations about the selected corresponding opposite party, which will be further described below. As indicated by reference numeral 25, the View Relations screen 20 may be implemented in such a way that an indicator (for example, an arrow, a pointer, a focus, etc.) can indicate a currently selected opposite party. Similar to the Send email tab 14, in FIG. 1, the View Relations screen 20 may be implemented in such a way that an executable function list 26 can be added to each opposite party. In addition, the screen 20 may be implemented in such a way to add a filtering list 27 that filters the opposite parties based on groups.

A View Rank screen 30 in FIG. 3 shows a list composed of fields including a rank 31, a name 32, an amount of log data 33, and an executable function 34 of each opposite party. Reference numeral 35 is indicative of a list of periods for calculating information on human relations, for example, a one-week ranking, a fifteen-day ranking, and a one-month ranking, etc. Reference numeral 36 is indicative of the filtering list as described above.

It will be appreciated that the screens for providing information on human relations as shown in FIGS. 1 to 3 are only preferred embodiments and thus should not be analyzed to limit the present invention. As well, it should be understood that there may be various modifications or alterations based on the present invention.

An apparatus for providing information on human relations according to an embodiment of the present invention is described in detail below, referring to FIG. 4.

Figure 4:
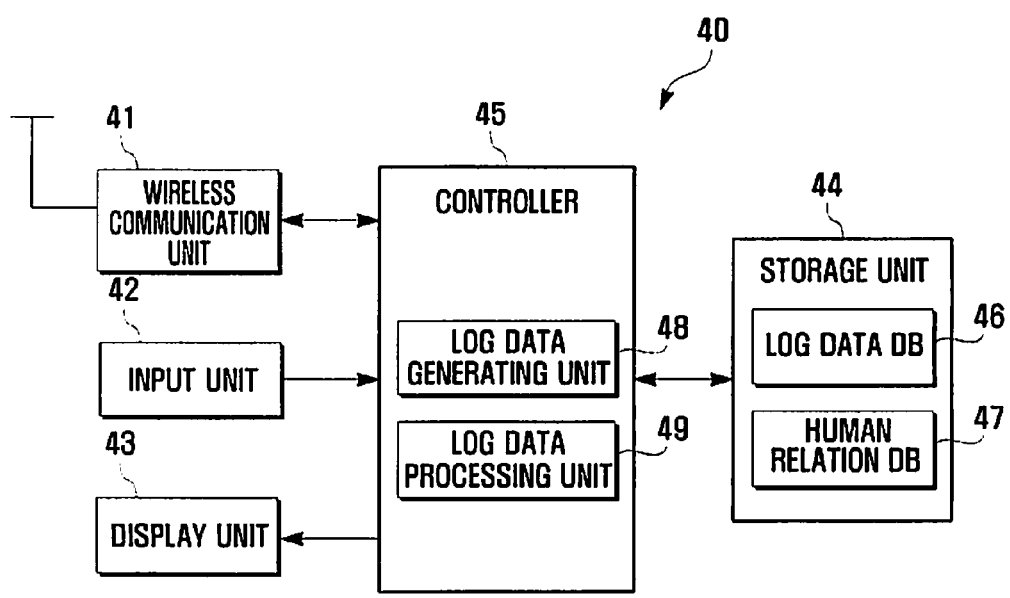
FIG. 4 is a schematic block diagram illustrating an apparatus for providing information on human relations according to an exemplary embodiment of the present invention.

As shown in FIG. 4, the apparatus 40 for providing information on human relations, hereinafter referred to as an apparatus, includes a wireless communication unit 41, an input unit 42, a display unit 43, a storage unit 44, and a controller 45. The storage unit 44 includes a log data DataBase (DB) 46 and a human relation DB 47. The controller 45 includes a log data generating unit 48 and a log data processing unit 49.

The apparatus 40 may be implemented with a portable terminal having a wireless communication function, i.e., a mobile communication terminal. The mobile communication terminal includes a smart phone, a Personal Digital Assistant (PDA), a mobile broadcasting receiver, such as a Digital Multimedia Broadcasting (DMB) receiver, etc., an MP3 player, and a portable multimedia player, etc.

The wireless communication unit 41 transmits and receives a wireless communication signal to allow terminals to communicate with each other. For example, the wireless communication unit 41 modulates a message signal output from the controller 45, converts the frequency of the signal, and transmits a Radio Frequency signal (RF) through an antenna. Also, the wireless communication unit 41 separates a message signal from an RF signal received through the antenna, coverts the frequency of the signal, and outputs the converted signal to the controller 45.

The input unit 42 detects user's inputs, generates input signals corresponding thereto, and outputs the input signals to the controller 45. For example, the input unit 42 inputs a corresponding opposite party and a period to calculate information on human relations of the corresponding opposite party from a user and then generates a corresponding input signal. The input unit 42 may be implemented with pointing devices, such as a keypad, a key touchpad, etc., and other general input devices, such as a touch screen, etc.

The display unit 43 displays a variety of information on its screen according to the control of the controller 45. For example, the display unit 43 may display information on human relations about a particular opposite party cyclically, as shown in FIG. 1. Further, the displays unit 43 may display information on human relations about a selected opposite party as shown in FIG. 2. In addition, the display unit 43 may display information on human relations about all the opposite parties collectively, as shown in FIG. 3. The display unit 43 may be implemented with various display devices, preferably an LCD.

The storage unit 44 stores various programs executed according to the control of the controller 45 and various data generated as the programs are executed. The storage unit 44 includes at least one volatile memory and non-volatile memory. In particular, the log data DB 46 of the storage unit 44 stores all log data for a certain period of time, and the human relations DB 47 stores information on human relations based on opposite parties, which is calculated based on the log data.

The controller 45 may be implemented with a micro-processor that controls the entire operation of the apparatus 40. In particular, the log data generating unit 48 of the controller 45 generates log data as a communication event occurs or as a user performs a preparation, and stores it in the log data DB 46. The log data processing unit 49 acquires log data of first and second periods, and calculates the amount of log data according to the respective first and second periods. The log apparent through the following description of a method for providing information on human relations according to the present invention.

Figure 5:
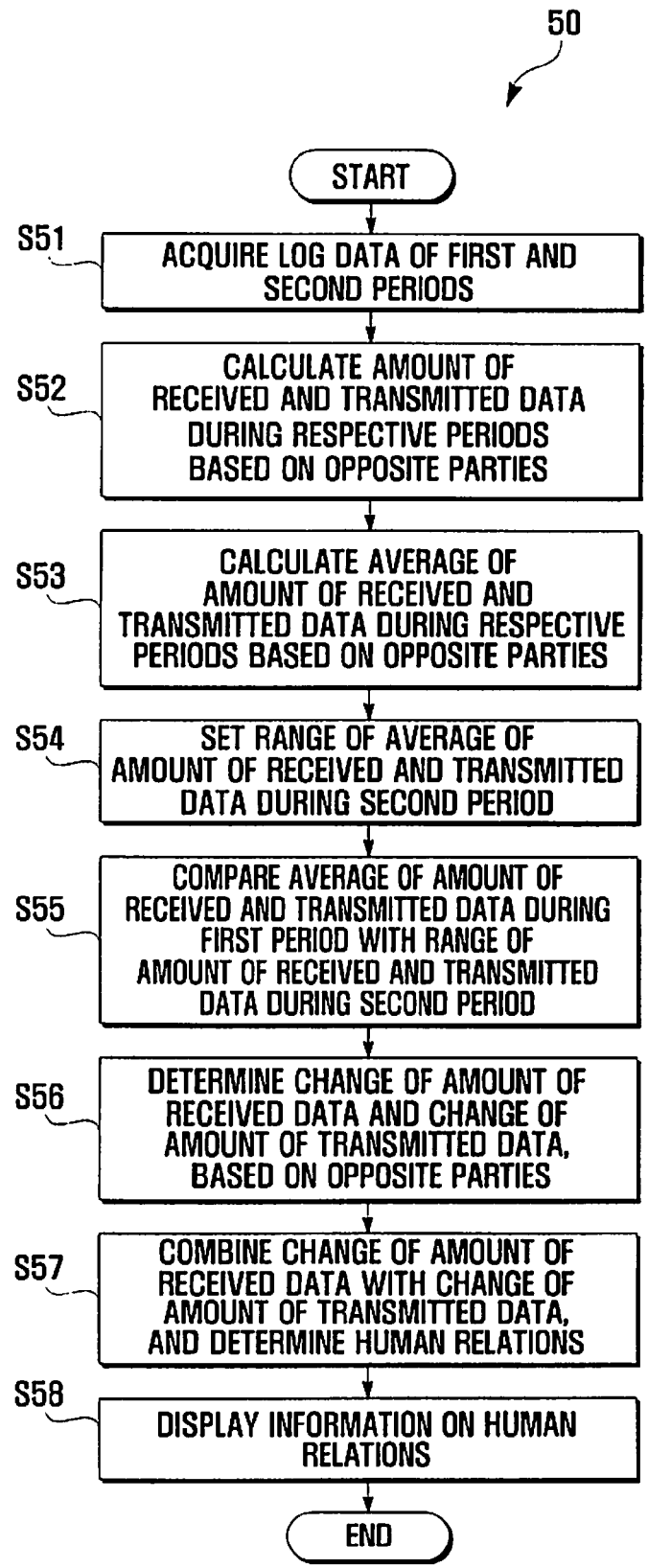
FIG. 5 is a flow chart illustrating a method for providing information on human relations according to an exemplary embodiment of the present invention.

FIG. 5 is a flow chart illustrating a method for providing information on human relations according to an exemplary embodiment of the present invention.

Referring to FIGS. 4 and 5, the log data processing unit 49 acquires log data of first and second periods, in step S51. The log data is generated in the log data generating unit 48 and stored in the log data DB 46. The log data processing unit 49 acquires log data of a first period and log data of a second period from the log data DB 46. The log data is acquired at every predetermined time points, every times requested by a user, and every times new log data is generated.

The first period may be set to from x days ago to today, and the second period may be set to from y days ago to x+1 days ago, where x and y are the natural numbers and y is greater than x. For example, the first period can be set to from 9 days ago to 10 days ago, and the second period can be set to from 59 days ago to 10 days ago. For another example, according to a user's selection, the first period can be set to the most recent one week period, the most recent 15 days, and the most recent one month period. In this case, the second period can be set to a multiple of the first period. To determine the change in human relations, the second period is preferably greater than or equal to first period.

In addition, the first period may be set to from x days ago to today, and the second period may be set to from z days ago to, where x, y, and z are the natural numbers and z is greater than y. Unlike the previous example, y may be selected to not be equal to x+1, to be less than x, or to be greater than x+1.

The log data acquired at step S51 may be referred to all log data or only a type of log data, stored in the log data DB 46. For example, only the following records can be acquired, which are incoming records of voice calls, originating records of voice calls, incoming records of SMS messages, and outgoing records of SMS messages. If only a specific type of log data is acquired, the type must be previously set or be selected by a user.

The log data processing unit 49 analyzes the log data and calculates amounts of log data based on the respective periods based on opposite parties, in step S52. For example, based on opposite parties, an amount of received data (or received data amount) for the first period and an amount of transmitted data (or transmitted data amount) are calculated. The following Table 1 describes received data amount and transmitted data amount calculated with respect to a particular opposite party, which are shown in FIG. 6.

TABLE 1

| | Period | | | | | | | | | | | |
|---|---|---|---|---|---|---|---|---|---|---|---|---|
| | Second Period (50 days) | | | | | | First Period (10 days) | | | | | |
| | Days | | | | | | | | | | | |
| | −59 | −58 | −57 | ... | −12 | −11 | −10 | −9 | −8 | −7 | ... | −2 | −1 | Today |
| Received data amount | 3 | 6 | 4 | ... | 6 | 6 | 3 | 5 | 5 | 3 | ... | 0 | 2 | 0 |
| Trans. data amount | 0 | 0 | 1 | ... | 2 | 2 | 1 | 0 | 3 | 2 | ... | 2 | 4 | 1 | data processing unit 49 calculates the averages of the amounts of log data based on opposite parties, compares the averages of the first and second periods, and determines the change in human relations. The function of the controller 45 will be To acquire an amount of log data, only the number of uses may be calculated. Additionally, use time and data capacity may also be calculated. In Table 1, the received and transmitted data amounts are obtained as only the number of uses is calculated. If the use time and the data capacity are calculated, the total amount can be obtained as different weights are applied thereto.

The log data processing unit 49 calculates an average of the amount of log data with respect to each period based on opposite parties, in step S53. For example, referring to Table 1 and FIG. 6, the averages of the received and transmitted data amounts for the first period, and the averages of the received and transmitted data amounts for the second period are calculated, respectively. The calculated results are described in following Table 2.

TABLE 2

| | Period | | | | | | | | | | | | |
|---|---|---|---|---|---|---|---|---|---|---|---|---|---|
| | Second Period (50 days) | | | | | | First Period (10 days) | | | | | | |
| | Days | | | | | | | | | | | | |
| | −59 | −58 | −57 | ... | −12 | −11 | −10 | −9 | −8 | −7 | ... | −2 | −1 | Today |
| Received data amount | 3 | 6 | 4 | ... | 6 | 6 | 3 | 5 | 5 | 3 | ... | 0 | 2 | 0 |
| Average | | | 2.9 | | | | | | | 3.2 | | | | |
| Trans. data amount | 0 | 0 | 1 | ... | 2 | 2 | 1 | 0 | 3 | 2 | ... | 2 | 4 | 1 |
| Average | | | 1.7 | | | | | | | 2.4 | | | | |

The log data processing unit 49 compares the average of the amount of log data for the first period with that of the amount of log data for the second period. Although the two averages can be directly compared, it is preferable that a range of the average of the log data amount for the second period is set and then compared with the average of the log data amount of the first period. Here, the range is obtained as the average of the log data amount for the second period is allowed to have upper and lower limits. The upper and lower limits are preferably set to 120% and 80% of the average, respectively. The following Table 3 describes when a range is set in the averages of the amounts of the received and transmitted data for the second period, respectively.

data amount for the first period is out of the range (1.36~2.04) of the received data amount for the second period.

The log data processing unit 49 determines the change in human relations based on the results of the comparison, in step S57. If the average of the amount of log data for the first period is: greater than the range of the amount of log data for the second period, the change in human relations is determined to be improving; less than the range of the amount of log data for the second period, the change in human relations is determined to be weakening; and within the range of the amount of log data for the second period, the change in human relations is determined to be maintaining; and, if there is no log data in the first or second period, the change in human relations is determined to be "none". As described in Table 3, since the average (3.2) of the received data amount in the first period exists within the range (2.32~3.48) of the received data amount in the second period, the change in human relations is determined to be maintaining. In addition, since the average (2.4) of the transmitted data amount in the first period is greater than the range (1.36~2.04) of the received data amount in the second period, the change in human relations is determined to be improving.

As such, when log data includes received data and transmitted data, the changes of the received data amount and the

TABLE 3

| | Period | | | | | | | | | | | | |
|---|---|---|---|---|---|---|---|---|---|---|---|---|---|
| | Second Period (50 days) | | | | | | First Period (10 days) | | | | | | |
| | Days | | | | | | | | | | | | |
| | −59 | −58 | −57 | ... | −12 | −11 | −10 | −9 | −8 | −7 | ... | −2 | −1 | Today |
| Received data amount | 3 | 6 | 4 | ... | 6 | 6 | 3 | 5 | 5 | 3 | ... | 0 | 2 | 0 |
| Average | | | 2.9 | | | | | | | 3.2 | | | | |
| Range | | | 2.32~3.48 | | | | | | | | | | | |
| Trans. data amount | 0 | 0 | 1 | ... | 2 | 2 | 1 | 0 | 3 | 2 | ... | 2 | 4 | 1 |
| Average | | | 1.7 | | | | | | | 2.4 | | | | |
| Range | | | 1.36~2.04 | | | | | | | | | | | |

The log data processing unit 49 sets the range in the average of the amount of log data for the second period, in step S54, and then compares the range of the average of the amount of log data for the second period with the average of the amount of log data for the first period, in step S55. In Table 3, the average (3.2) of the received data amount for the first period is within the range (2.32~3.48) of the received data amount for the second period, and the average (2.4) of the transmitted transmitted data amount based on opposite parties are determined, respectively, in step S56, and then the change in human relations is determined by combining the change of the received data amount with that of transmitted data amount, in step S57. The change of the received data amount refers to how the change that opposite parties contact with a user is changed. The change of the transmitted data amount refers to how the change that a user contacts with opposite parties is changed. The change in human relations may be variously determined by combining the change of the received data amount with the change of the transmitted data amount.

FIG. 7 shows a list describing types and patterns of change in human relations, according to an exemplary embodiment of the present invention. As shown in FIG. 7, the change of the received data amount is classified into "increasing," "maintaining," "decreasing," and "none." Similarly, the change of the transmitted data amount is also divided into "increasing," "maintaining," "decreasing," and "none." Therefore, by combining both changes of the received data amount and the transmitted data amount, the number of cases is 16. The respective cases have different texts to express the change in human relations. Text 11 shown in FIG. 1 and text 24 shown in FIG. 2 are included in the list of patterns expressing the change in human relations. The types of the changes of the received data amount and the transmitted data amount are allocated by different icons as display patterns. An exemplary example of assigning an icon to a type of the changes of the received data amount and the transmitted data amount is shown in FIG. 2.

It will be appreciated that the types and display patterns of the change in human relations as shown in FIG. 7 are only preferred embodiments and thus should not be analyzed to limit the present invention. As well, it should be understood that there may be various modifications or alterations based on the present invention. For example, the display patterns of the changes of the received and transmitted data amounts may be implemented with other graphic elements or numerals, etc., instead of icons.

The log data processing unit 49 stores information on human relations, such as an amount of log data, the average and the range of the amount of log data, and change in human relations, in a human relations DB 47, and displays it on the display unit 43, in step S58. As shown in FIGS. 1 to 3, the information on human relations can be displayed through various types of screens according to a user's selection. For example, the information on human relations of a particular opposite party is displayed in a cycle as shown in FIG. 1; the information on human relations of a selected opposite party is displayed as shown in FIG. 2; or the information on human relations of all opposite parties are displayed collectively as shown in FIG. 3.

According to the calculation objects or calculation period of information on human relations, corresponding information on human relations can be selectively displayed, as in step S58. When the rank as shown in FIG. 3 is displayed, the rank can be determined according to a summation of the amount of log data for the first and second periods or according to the amount of log data for the first period.

The apparatus 40 of FIG. 4 directly generates and provides information on human relations in a terminal generating log data. For example, when log data is generated in a mobile phone, the apparatus directly generates and provides information on human relations in the mobile phone. To the contrary, the apparatus can be applied in a case where a terminal generating log data is different from a terminal generating information on human relations. For example, such an embodiment of the present invention can be modified in such a way that: a mobile phone generates log data, and another terminal, such as a mobile phone, a Personal Digital Assistant (PDA), a computer, and a web server, receive the log data from the mobile phone and generates information on human relations. Such a modification is shown in FIG. 8.

As shown in FIG. 8, an apparatus for providing information on human relations includes a first terminal 80 and a second terminal 90. The first terminal 80 is preferably a mobile communication terminal generating log data. The second terminal 90 is a terminal that serves to acquire the log data and generate information on human relations. The second terminal 90 does not need to be implemented as a mobile communication terminal.

The first terminal 80 is configured to include a wireless communication unit 81, a first input unit 82, a first display unit 83, a first storage unit 84, a first controller 85, and a first communication interface unit 86. The first storage unit 84 includes a log data DB 87. The first controller 85 includes a log data generating unit 88.

The second terminal 90 is configured to include a second input unit 91, a second display unit 92, a second storage unit 93, a second controller 94, and a second communication interface unit 95. The storage unit 93 includes a human-relations DB 96. The second controller 94 includes a log data processing unit 97.

The first and second terminals 80 and 90 are connected with each other through the first and second communication interface units 86 and 95, in wire method, such as USB communication and IEEE 1394 communication, and/or in wireless method, such as Bluetooth® communication and InfraRed Data Association (IrDA) communication. Except for the first communication interface unit 86, other elements of the first terminal 80 have already been described referring to FIG. 4 and so their descriptions will be omitted. Since the second terminal 90 is similar to the first terminal 80 except that the second terminal 90 may not include a wireless communication unit and its configuration elements may not be optimized for a mobile communication terminal, the detailed description of the second terminal 90 is omitted.

Figure 9:
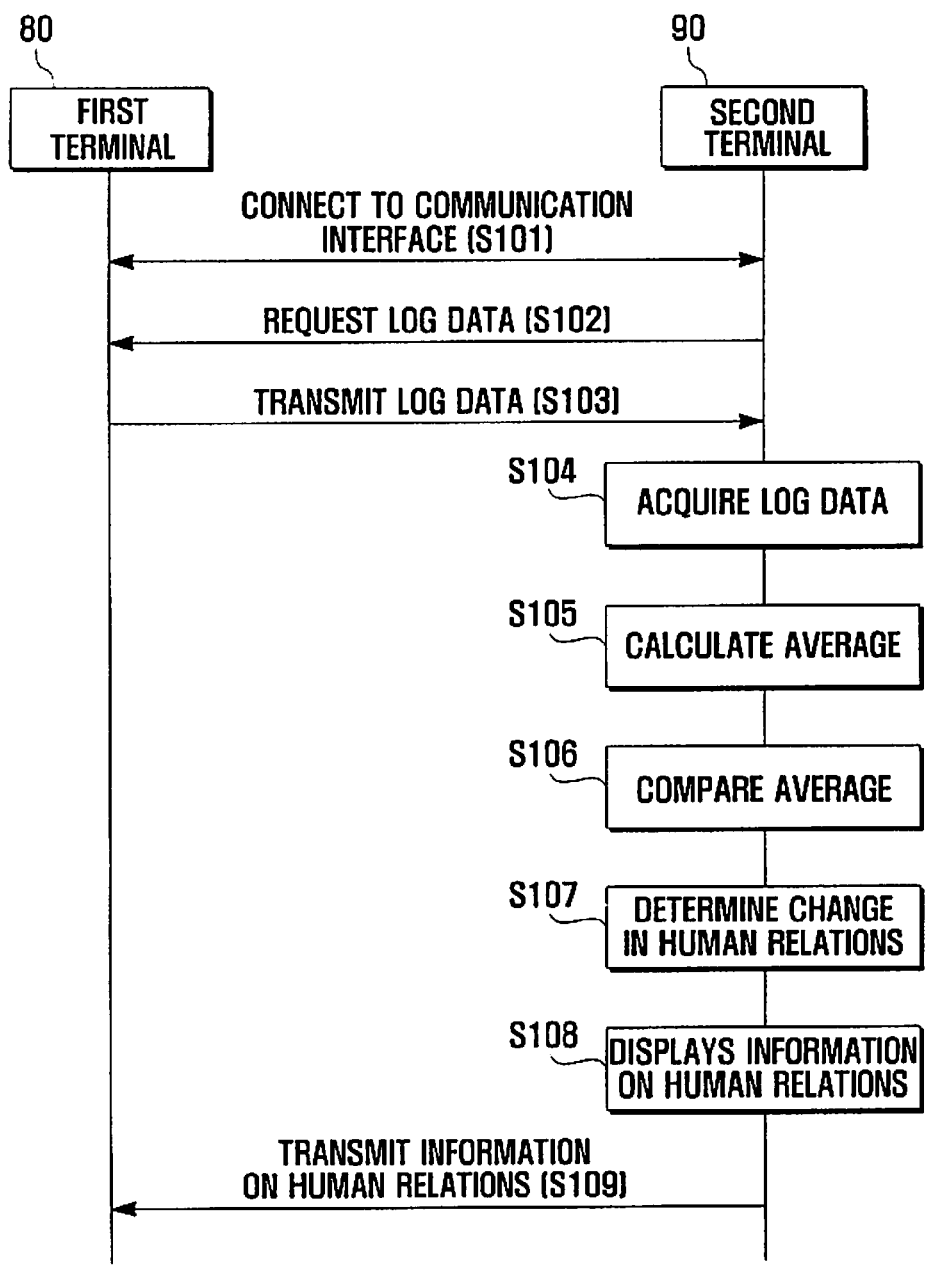
FIG. 9 is a flow chart illustrating a method for providing information on human relations according to another exemplary embodiment of the present invention.

A method for providing information on human relations performed through the first and second terminals of FIG. 8 is described referring to FIG. 9.

Referring to FIGS. 8 and 9, the first and second terminals 80 and 90 are connected to each other through the first and second communication interface units 86 and 95, in step S101. The second terminal 90 requests log data to the first terminal 80, in step S102. In response to the request of the first terminal 80, the first terminal 80 transmits log data stored in the log data DB 87 to the second terminal 90, in step S103.

The second terminal 90 acquires the log data transmitted from the first terminal 80, in step S104. The log data processing unit 96 of the second terminal 90 calculates the amounts of log data for the first and second periods, respectively, and calculates the averages of the amounts of the log data for the first and second periods, respectively, in step S105. The log data processing unit 96 compares the two calculated averages, in step S106, and determines the change in human relations, in step S107.

The second terminal 90 displays the change in human relations and the information on human relations on the second displays unit 92, in step S108. The second terminal 90 may also transmit the information on human relation to the first terminal 80, in step S109.

In the meantime, since steps S104 to S108 in the method of FIG. 8 are similar to the steps of the method shown in FIG. 5 that have been already explained, their detailed descriptions will be omitted.

As described above, the method and apparatus according to the present invention can analyze many aspects of log data generated in a mobile communication terminal, calculate the change in human relations based on opposite parties of communication, and provide information on human relations based on the change, in a variety of ways.

The method and apparatus for providing information on human relations according to the present invention allow users to read the change in human relations based on opposite parties of communication easily. The method and apparatus can provide the number of communications or determine whether the total number of the communications is large or small, and can also provide information about whether the number of communications or the total number of the communications has increased or decreased.

The method and apparatus for providing information on human relations according to the present invention sort the log data into received data and transmitted data to provide the change of the received data and the change of the transmitted data, respectively, and combines the changes to provide the change in human relations.

The method and apparatus for providing information on human relations according to the present invention may use communication records between the user and opposite parties and personal information prepared by the user to calculate the information in human relations.

As described in the foregoing, the preferred embodiments of the method and apparatus for providing information on human relations, according to the present invention, have been disclosed and explained based on some terms defined for the present invention description. But it will be appreciated that such terms do not limit the scope of the present invention. In addition, although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A method for providing information on human relations comprising:
    acquiring first log data for a most recent first period and second log data for a second period from a mobile communication terminal, wherein the second period is earlier than the most recent first period and each of the first log data and the second log data contains at least one communication record of opposite parties of the mobile communication terminal;
    analyzing the first log data and the second log data for each of the opposite parties;
    calculating averages of amounts of the first and second log data, respectively;
    comparing the calculated averages of the amounts of the first and second log data; and
    displaying visually a change in human relations determined based on results of the comparison for each of the opposite parties,
    wherein the change in human relations is determined to be:
        increasing, if the average of the first log data is greater than the average of the second log data; and
        decreasing, if the average of the first log data is less than the average of the second log data.

2. The method of claim 1, further comprising visually expressing the determined change in human relations.

3. The method of claim 2, wherein the visual expression displays the determined change in human relations through at least one of texts, numerals, and graphic elements.

4. The method of claim 1, further comprising transmitting the determined change in human relations.

5. The method of claim 1, wherein:
    the first period is from a current day to before x days ago to the current day; and
    the second period is from before x+1 days to before y days ago to x+1 days ago,
    wherein x and y are natural numbers, and y is greater than x.

6. The method of claim 1, wherein the first and second log data comprise communication records generated as a user communicates with each of the opposite parties, respectively, and personal information prepared by the user.

7. The method of claim 1, wherein comparing the first and second log data comprises:
    analyzing received data of the first and second log data, respectively, and comparing the received data of the first log data to the received data of the second log data; and
    analyzing transmitted data of the first and second log data, respectively, and comparing the transmitted data of the first log data to the transmitted data of the second log data.

8. The method of claim 7, wherein change in human relations comprises:
    determining changes of the received data and the transmitted data to be one of increasing, maintaining, decreasing, and no log data, respectively; and
    determining the change in human relations based on a combination of the changes of the received data and the transmitted data.

9. The method of claim 8, further comprising visually expressing the change of received data, the change of transmitted data, and the change in human relations, respectively.

10. A method for providing information on human relations comprising:
    acquiring first log data for a most recent first period and second log data for a second period from a mobile communication terminal, wherein the second period is earlier than the most recent first period and each of the first log data and the second log data contains at least one communication record of opposite parties of the mobile communication terminal;
    analyzing the first log data and the second log data for each of the opposite parties
    calculating averages of amounts of the first and second log data, respectively;
    setting a range having upper and lower limits to the average of the second log data;
    comparing the average of the first log data with the range of the average of the second log data; and
    displaying visually a change in human relations determined based on results of the comparison for each of the opposite parties.

11. A method for providing information on human relations comprising:
    acquiring first log data for a first period and second log data for a second period from a mobile communication terminal, wherein each of the first log data and the second log data contains at least one communication record of opposite parties of the mobile communication terminal;
    calculating an amount of the first log data and an amount of the second log data, for each of the opposite parties, from the first log data and the second log data, respectively;
    calculating averages of the amount of the first log data and of the amount of the second log data, for each of the opposite parties, respectively;
    comparing the calculated average of the amount of the first log data to the average of the amount of the second log data; and
    displaying visually a change in human relations determined for each of the opposite parties based on results of the comparison.

12. The method of claim 11, further comprising: visually expressing the determined change in human relations based on each of the opposite parties.

13. The method of claim 12, wherein the visual expression displays the determined change in human relations based on each of the opposite parties through at least one of texts, numerals, and graphic elements.

14. The method of claim 12, wherein the visual expression displays a total rank according to the amounts of log data based on each of the opposite parties.

15. The method of claim 11, further comprising: transmitting the determined change in human relations based on each of the opposite parties.

16. The method of claim 11, wherein:
the first period is from x days ago to a current day; and
the second period is from y days ago to x+1 days ago,
wherein x and y are natural numbers, and y is greater than x.

17. The method of claim 16, wherein the second period is greater than or equal to the first period.

18. The method of claim 11, wherein the first and second log data comprises communication records generated as a user communicates with each of the opposite parties, respectively, and personal information prepared by the user.

19. The method of claim 18, wherein the communication records comprise at least one of incoming/originating records of voice calls and video calls, incoming/originating records of Short Message Service (SMS) messages and multimedia messages, incoming/originating records of emails, incoming/originating records of data, and use records of messengers.

20. The method of claim 11, wherein comparing the calculated averages comprises:
setting a range having upper and lower limits to the average of the amount of second log data; and
comparing the average of the amount of first log data with the range of the average of the amount of second log data.

21. The method of claim 20, wherein change in human relations comprises:
determining the change in human relations to be increasing if the average of the amount of the first log data is greater than the range of the average of the amount of the second log data;
determining the change in human relations to be decreasing if the average of the amount of first log data is less than the range; and
determining the change in human relations to be maintaining if the average of the amount of first log data is within the range.

22. The method of claim 11, wherein calculating averages comprises:
calculating averages of received data amount and transmitted data amount of the first log data; and
calculating averages of received data amount and transmitted data amount of the second log data.

23. The method of claim 22, wherein comparing the calculated averages comprises:
comparing the average of the received data amount of first log data with the average of the received data amount of second log data; and
comparing the average of the transmitted data amount of first log data with the average of the transmitted data amount of second log data.

24. The method of claim 23, wherein change in human relations comprises:
determining changes of the received data amount and of the transmitted data amount to be one of increasing, maintaining, decreasing, and no log data, respectively; and
determining the change in human relations based on a combination of the changes of the received data amount and of the transmitted data amount.

25. The method of claim 24, further comprising visually expressing the change of the received data amount, the change of the transmitted data amount, and the change in human relations, respectively.

26. An apparatus for providing change in human relation comprising:
a unit for generating log data, wherein the log data containing at least one communication record of opposite parties of the apparatus;
a log data DataBase (DB) for storing the log data;
a human relations DB for storing changes in human relations for each of the opposite parties, which are calculated based on the log data;
a log data processing unit for acquiring the log data for first and second periods from the log data DB, calculating amounts of log data for the respective first and second periods for each of the opposite parties, calculating averages of the respective amounts of log data for the first and second periods, comparing the averages of the amounts of log data for the first and second periods with each other, and determining changes in human relations for each of the opposite parties; and
a display unit for displaying visually the changes in human relations determined for each of the opposite parties.

* * * * *